United States
Komine

[11] 3,834,796
[45] Sept. 10, 1974

[54] AUTO ZOOM DEVICE FOR A MOTION PICTURE CAMERA

[75] Inventor: Yoshio Komine, Tokyo, Japan

[73] Assignee: Canon Kabushiki Kaisha, Tokyo, Japan

[22] Filed: Sept. 6, 1973

[21] Appl. No.: 394,649

[30] Foreign Application Priority Data
Sept. 6, 1972    Japan................................ 42-89215

[52] U.S. Cl. .............................................. 350/187
[51] Int. Cl. .......................................... G02b 15/00
[58] Field of Search ............. 350/187; 352/139, 140

[56] References Cited
UNITED STATES PATENTS
2,995,061   8/1961   Briskin et al..................... 350/187 X
3,106,125   10/1963  Martin et al....................... 350/187
3,631,786   1/1972   Crapsey, Jr..................... 350/187 X Primary Examiner—Paul A. Sacher
Attorney, Agent, or Firm—William R. Woodward; Flynn & Frishauf

[57] ABSTRACT

An auto zoom device for a motion-picture camera which can make a changeover from auto zoom by an electric motor to manual zoom. The auto zoom device comprises engaging-and-disengaging means provided between a rotating member driven by an electric motor and a zoom-lens tube rotating member driven by the first mentioned rotating member, a changeover member which permits a changeover between auto zoom and manual zoom, a rotating lever for shifting the engaging-and-disengaging means between an operative and inoperative positions in an interlocking relationship with the changeover member, and quick zoom-up operating means cooperable with the rotating lever independently of the changeover member, thereby permitting quick zoom-up in either state, auto zoom or manual zoom.

5 Claims, 5 Drawing Figures

AUTO ZOOM DEVICE FOR A MOTION PICTURE CAMERA

BACKGROUND OF THE INVENTION

1. Field of the Invention

The invention is directed to the field of auto zoom devices for a motion-picture camera and more particularly to an auto zoom device for a motion-picture camera having a changeover mechanism between auto zoom by an electric motor and manual zoom, said auto zoom device including a quick zoom-up mechanism for adjustment of the focus which can be operated in either state.

2. Description of the Prior Art

In a conventional motion-picture camera where a zoom lens is provided, focussing has generally been carried out in the farmost telephoting side. To this end, both of manual zooming and auto zooming is practicable. Moreover, a camera additionally provided with a quick zoom-up device for the purpose of focussing quicker in speed than normal auto zooming has been presented. In such cameras, quick zoom-up is carried out by changeover of a driving circuit of an electric motor from normal zoom to quick zoom. That is, the highest speed is utilized among variable zoom speeds. Since this conventional camera provided with a quick zoom-up device is not equipped with engaging-and-disengaging means for a changeover from auto zoom to manual zoom and the gear trains between an electric motor and a zoom tube are in engagement at all times, a smooth manual zoom may not be effected, which is a great disadvantage. On the contrary, in order to effect such a smooth manual zooming, it is essential to provide an engaging-and-disengaging mechanism for changing between auto zoom and manual zoom. In such a construction, however, in the event that the engaging-and-disengaging mechanism has been shifted to a position of manual zoom, an auto quick zoom-up operation can not be initiated before said mechanism is changed over to the auto zoom.

SUMMARY OF THE INVENTION

The invention overcomes the disadvantages noted above with respect to prior art devices by providing an auto zoom device for a motion-picture camera which can offer a quick auto zoom-up operation in either case, auto zoom or manual zoom.

Another object of this invention is to provide an auto zoom device for a motion-picture camera which can change over in a simple manner from manual zoom to auto zoom, and vice versa.

A further object of this invention is to provide an auto zoom device for a motion-picture camera which may eliminate unnecessary changeover operations between manual and auto to facilitate operation since, after a quick zoom-up operation has been completed, the camera is returned to the condition prior to the quick zoom-up operation, which may be manual zoom operating or auto zoom operation.

DESCRIPTION OF THE PREFERRED EMBODIMENTS

This invention relates to an auto zoom device for a motion-picture camera capable of a quick auto zoom-up operation in either case, auto zoom or manual zoom, and comprising engaging-and-disengaging means 8 and 14 provided between an electric motor 5 and a zoom-lens tube rotating member 13, changeover operating means from auto zoom to manual zoom, rotating means for placing the engaging-and-disengaging means in an operative or inoperative position in an interlocking relationship with the changeover operating means, and quick zoom-up operating means cooperatable with the rotating means independently of said changeover operating means, the zoom-up being made capable by operation of the zoom-up operating means in either state, auto zoom or manual zoom.

Figure 1:
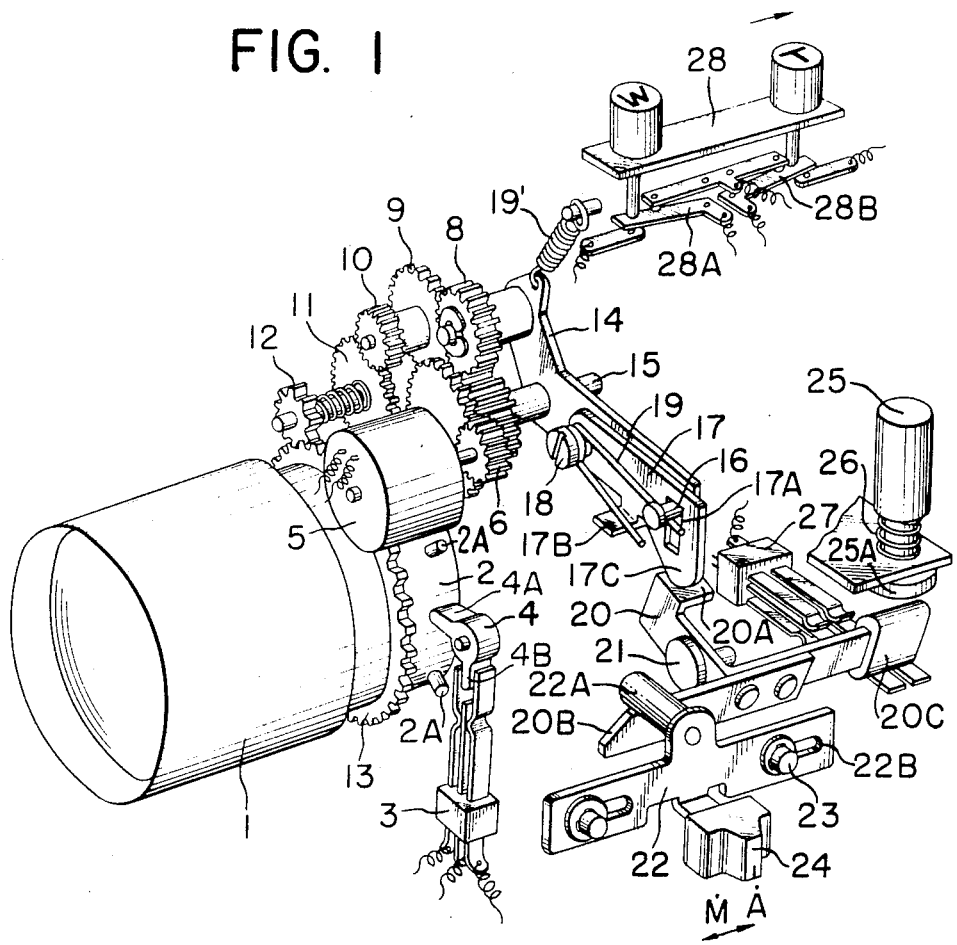
FIG. 1 is a perspective view showing one mode of embodiment of an auto zoom device for a motion-picture camera according to the invention.

FIG. 1 shows a state of auto zoom. In FIG. 1, there are shown a lens tube 1 encasing a zoom lens, a zoom rotating tube 2 for displacing said zoom lens along an optical axis to adjust a focal distance, pins 2A planted in the both rotating ends of the zoom rotating tube to actuate a zoom end switch 3, and a rotating crank 4 formed of plastic and serving also as a rotating crank to engage with said pins 2A, thus actuating the switch 3. A zoom motor for auto zoom is indicated as at 5, transmission gears for auto zoom are indicated at 6 and 7, and an engaging-and-disengaging gear 8 is always meshed with the gear 7 to form an engaging-and-disengaging mechanism hereinafter described in detail. Gear 9 adapted to engage and disengage from said engaging-and-disengaging gear 8 is connected to a gear 13 for rotating said zoom rotating lens tube 2 through gear trains 10, 11 and 12, and when meshed with the engaging-and-disengaging gear 8, rotation of said electric motor 5 is transmitted to the zoom rotating lens tube 2. A rotating lever 14 is mounted on the engaging-and-disengaging gear 8 and is rotatable about a shaft 15 secured to main body. A spring 19 is provided to rotate and urge said rotating lever in a clockwise direction at all times. A pin 16 is planted in one end opposite to the engaging-and-disengaging gear 8 with respect to the shaft 15 of said rotating lever, and this pin is engaged with a slot 17A of a rotating plate 17 rotatably supported by a shaft 18 to the rotating lever. The rotating plate 17 is so mounted as to generally effect an integral motion with said rotating lever by means of a spring 19' provided between a projection 17B of the rotating plate 17 and the pin 16 through the shaft 18. In other words, the clockwise direction of the rotating lever 14 means a direction of releasing said engaging-and-disengaging gear 8 from being meshed with the gear 9. An operating member 20 is adapted to be rotated on a shaft 21 secured to main body and has one end 20A placed engageable with one end 17C of said rotating plate 17. a reference character 20B denotes a tapered portion in one end of said operating member and 20C is an insulated portion. A changeover member from auto zoom to manual zoom has a column 22A engageable with the tapered portion 20B of said operating member to manipulate the changeover operating member 24 in a direction as indicated by the arrow with a slot 22B in engagement with a shaft 23 secured to main body serving as a guide slot. A fixed index 24A is marked on the operating member 24, which is slidingly moved so as to meet indexes M (manual zoom) and A (auto zoom) likewise marked on main body. A button 25 is provided to effect a quick zoom-up operation for adjustment of the focus in the farmost telephoto side and is always held in its inoperative position by means of a coil spring 26. A member 25A serves to press down the insulated portion 20C of said operating member 20 by depression of button 25 and to actuate quick zoom-up switch means 27. A reference character 28 is a known auto zoom operating member which is operatively connected with changeover switches 28A and 28B.

Figure 2:
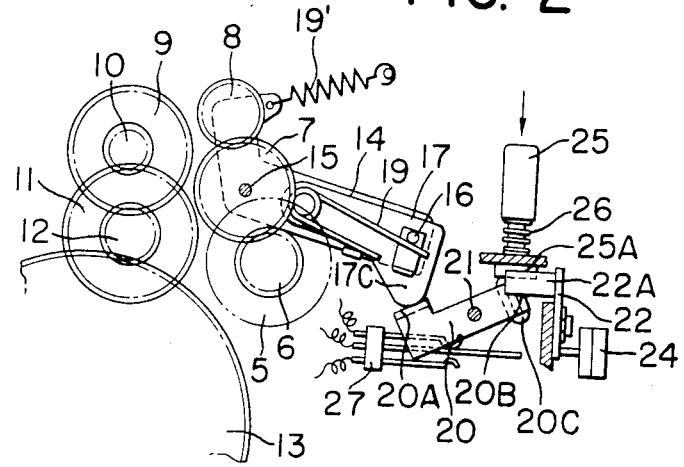
FIG. 2 is a front view showing a state of manual zoom of the auto zoom device for a motion-picture camera in FIG. 1.

The operations of manual zoom state, auto zoom state, and quick zoom-up state, with such construction as described above, will now be described with reference to FIGS. 2 – 4 in addition to FIG. 1. FIG. 2 shows the manual zoom state. When the changeover operating member 24 (hereinafter called an AM changeover member) from auto zoom operation to manual zoom operation is slid to have index 24A met M position, the column 22A of the changeover member 22 is brought into a position at the tapered portion 20B of the operating member 20, thereby causing said operating member 20 to be rotated in a counterclockwise direction on the shaft 21. Since the rotating lever 14 carrying the engaging-and-disengaging gear 8 is urged by the spring 19' to be rotated in a clockwise direction at all times on the shaft 15, the rotating lever 14 rotates in a counterclockwise direction following the rotation of said operating member 20 and the resultant downward movement of one end 20A thereof to release meshing between the engaging-and-disengaging gear 8 and the auto zoom transmission gear 9 as shown in FIG. 2. In such a state, the zoom lens mount is rotated by means of a lever etc. not shown to provide a light manual zoom operation.

Figure 3:
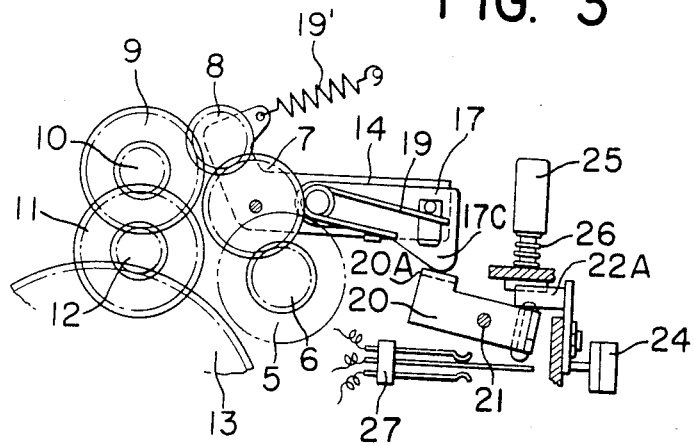
FIG. 3 is a front view showing a state of auto zoom of the auto zoom device for a motion-picture camera in FIG. 1.

FIG. 3 shows the auto zoom state. This state is the same as that shown in FIG. 1. Referring now to these drawings, when the AM changeover member 24 is slid to have its fixed index 24A met A position, the changeover member 22 travels to a position as shown in FIG. 1, and at this time the column 22A overrides the tapered portion 20B, the operating member 20 rotates in a clockwise direction on the support shaft 21, the rotating plate 17 being pushed up by one end 20A of the member 20, the rotating lever 14 is also rotated by the spring 19' in a counterclockwise direction on the support shaft 15 following the rotating plate, and the engaging-and-disengaging gear 8 is then meshed with the auto zoom transmission gear 9, thus placing it in auto zoom operatable condition. When telephoto side button (T) or wide angle side button (W) on the auto zoom operating member as shown in FIG. 1 is depressed in the condition as previously described, an auto zoom circuit hereinafter described is completed to render an auto zoom operation by actuation of the motor 5. The rotating crank 4 is rotated by the pin 3 on the zoom rotating lens mount 2 at the end of zoom, that is, on the farmost telephoto side or wide angle side, to actuate the zoom end switch 3 thereby disconnecting the zoom circuit.

Figure 4:
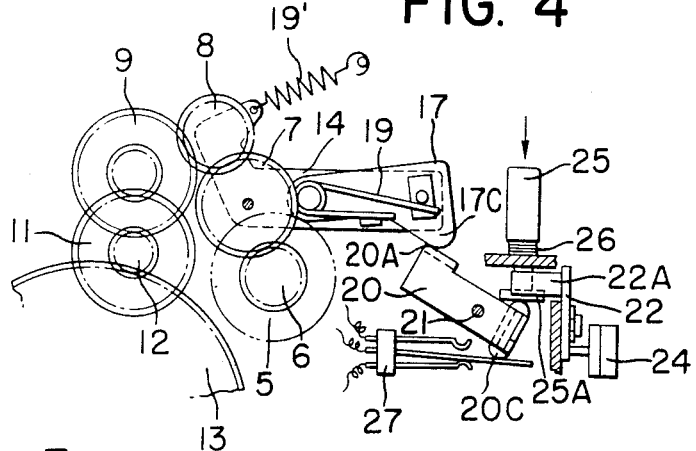
FIG. 4 is a front view showing a state of quick zoom-up of the auto zoom device for a motion-picture camera.

FIG. 4 shows a state in which a quick zoom-up operation is carried out by depressing the quick zoom-up button 25 for adjustment of the focus. First, the quick zoom-up operation changed from the state of manual zoom (FIG. 2) will now be described. When the quick zoom-up button 25 shown in FIG. 2 is depressed, the member 25A is brought in engagment with one end 20C of the operating member 20 to cause it to rotate in a clockwise direction about the shaft 21 so that the rotating lever 14 is rotated in a counterclockwise direction in interlocking therewith to have the engaging-and-disengaging gear 8 meshed with the auto zoom transmission gear 9. When the button 25 is further depressed, the clockwise rotation of the operating member 20 absorbs rotation of the operating member 20 after meshing of engaging-and-disengaging gear by rotation of the rotating plate 17 engaged with one end 20A of said member 20 in a counterclockwise direction about the support shaft 8 against the action of the spring 19. As described above, the button 25 has two steps of function, that is, in its first step of depression the engaging-and-disengaging gear 8 is meshed with the gear 9, and in its second step of depression the quick zoom-up switch 27 is actuated through the insulated portion 20C to complete a quick zoom-up circuit hereinafter described, whereby the zoom lens quickly moves toward the farmost telephoto side. Also, at the end thereof the zoom end switch 3 is actuated to stop running of the motor 5. Now, to change from the auto zoom state (FIGS. 1 and 3) to the quick zoom-up state, the engaging-and-disengaging gear 8 is already in meshing with the gear 9 so that the button 25 is depressed to actuate the zoom-up switch 27, and the same is true for thereafter action. After reaching the farmost telephoto side by depression of the zoom-up button, adjustment of the focus may be carried out. After completion of said operation, if the button depressed is released, the button is returned to its original position by means of a return spring 26 thereby returning to a state where zoom-up operation is not initiated.

Figure 5:
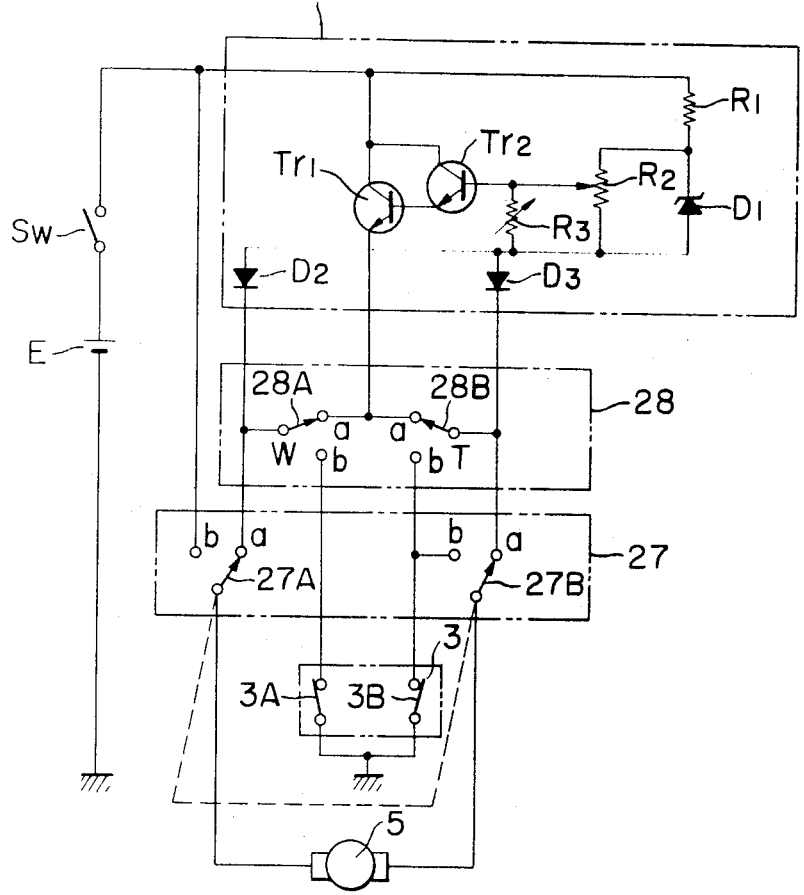
FIG. 5 is a connection diagram showing one example of an electric circuit applicable to the auto zoom device for a motion-picture camera according to the invention.

FIG. 5 is a connection diagram of an electric circuit applicable to the device in accordance with the invention. In FIG. 5, there are shown a motor 5, an end switch 3 having contact pieces 3A and 3B, a quick zoom-up switch 27 having contact pieces 27A and 27B, and an auto zoom switch 28 having contact pieces 28A and 28B, these elements are as previously described. An auto zoom speed variable circuit is indicated as at 30, which comprises elements incorporated therein such as NPN junction transistors $Tr_1$ and $Tr_2$ of Darlington connection, a Zener diode $D_1$, diodes $D_2$ and $D_3$ for preventing counterflow, a resistor $R_1$, a volt resistor $R_2$ of Zener voltage, and a correcting resistor $R_3$. A power source common to each circuit is indicated as at E. Although a known circuit may be used for this electric circuit, the operation of the circuit as shown will now be described.

The auto zoom speed variable circuit 30 is a known constant-voltage circuit. When the button W on the auto zoom operating member 28 is depressed after main switch SW is turned ON, the contact piece 28A is connected to contact $b$ from contact $a$. A current flows through the power source E, main switch SW, and resistor $R_1$. The base potential of the transistor $Tr_2$ is maintained in constant by the diodes $D_1$ and $D_2$, the Zener diode $D_1$, and the volt resistor $R_2$, thus maintaining a conductive state, and the transistor $Tr_1$ is also placed in conductive to maintain its collector potential in constant and therefore a current passes through the contact piece 28B, the contact piece 27B, the motor 5, the contact piece 27A, the contact piece 28A, and the contact piece 3A to complete a driving circuit of the motor. Thus, the zoom operation on the wide angle side is effected. For the zoom operation on the telephoto side, the contact piece 28B is connected from contact $a$ to contact $b$ by depressing the button T, and the motor 5 is driven in a manner similar to that of the foregoing. This auto zoom operation is stopped in either case when the contact piece 3A or 3B of the zoom end switch goes off at the extreme end thereof, which is caused by pin 2A or 2B engaging with a detecting member 4A to rotate a control member 4B.

To effect the quick zoom-up operation, the contact pieces 27A and 27B are changed over from contact $a$ to $b$ by actuation of the zoom-up switch 27, and a current passes through the power source E, the main switch SW, the contact piece 27A, the motor 5, the contact piece 27B, and the contact piece 3B, without passing through said auto zoom speed variable circuit, to thereby quickly actuate the motor 5, and accordingly the zoom rotating lens mount 2 moves to a farmost telephoting position, and the motor is then stopped by turning OFF the end switch 3B.

This invention provides an auto zoom device having a construction as described above, which permits easy changeover to a quick zoom-up by mere operation of the quick zoom-up button even when zoom operation is being made manually, eliminating a complicated operation required when manual is changed over to auto, which is extremely effective particularly for a motion-picture camera having a zoom lens of high zoom ratio. It will be understood that changing over from auto zoom to quick zoom-up may easily be made. The invention has further effect such that after completion of quick zoom-up, either manual zoom or auto zoom is restored to thereby minimize changing-over operation from manual to auto, thus facilitating operation.

I claim:

1. An auto zoom device capable of both of auto zooming operation and manual zooming operation, comprising:
   a zoom lens tube rotatable for zooming;
   rotating means for rotating said zoom lens tube;
   a motor for rotating said zoom lens tube through said rotating means, engaging-disengaging means for permitting, during auto zooming operation, transmittion of driving force by said motor to said rotating means, and preventing, during manual zooming operation, said transmition of the driving force by said motor to said zoom lens tube;
   motor driving means including, a first circuit for providing first driving force, a second circuit for providing second driving force to rotate said motor at higher speed than that by said first driving force, changeover means including a member for breaking said second circuit when said first circuit is completed, and breaking said first circuit when said second circuit is completed, thereby permitting the rotation of said motor at different speeds;
   controlling means for controlling said engagingdisengaging means, said controlling means being associated with said engaging-disengaging means and said changeover means to permit selective switchover between auto zooming operation and manual zooming operation and to permit, when said engagedisengage means is shifted to auto zooming position, the completion of said first circuit; and
   switching means for controlling said engaging-disengaging means irrespectively of said controlling means, said switching means being arranged so as to be actuated independently of said controlling means, and including, in at least a portion thereof, actuating means for actuating said controlling means, said actuating means permitting, when actuated, the shift of said engaging-disengaging means to the auto zooming position irrespectively of said controlling means and permitting the completion of said second circuit;
   thereby permitting quick zooming-up operation by placing said engaging-disengaging means at the auto zooming position and completing said second circuit.

2. An auto zoom device according to claim 1 further comprising switching means which breaks, when said zoom lens tube is displaced to one of its ends, said controlling means.

3. An auto zoom device according to claim 2, wherein said switching means includes:
   transmitter means for signaling the reaching of said zooming lens tube to one of its ends of displacement, said transmitter means being mounted on said zoom lens tube; and
   detecting means for detecting the signals from said transmitter means, said detecting means including a detecting member actuated in response to one of said signals from said transmitter means and a control member for switching said motor driving means in response to the actuation of said detecting member.

4. An auto zoom device according to claim 3, wherein said detecting means is formed of plastic.

5. An auto zoom device according to claim 3 wherein said transmitter means is projecting tubes.

* * * * *